Aug. 10, 1971 W. H. MOFFATT 3,598,571
SPRAY STEELMAKING METHOD
Filed Feb. 2, 1968

INVENTOR.
WILLIAM H. MOFFATT
BY Sherman H Barber
his Attorney

United States Patent Office 3,598,571
Patented Aug. 10, 1971

3,598,571
SPRAY STEELMAKING METHOD
William H. Moffatt, Lausanne, Switzerland, assignor to Koppers Company, Inc.
Filed Feb. 2, 1968, Ser. No. 702,570
Int. Cl. C21c 5/00
U.S. Cl. 75—52                       5 Claims

ABSTRACT OF THE DISCLOSURE

Improved apparatus for carrying out the method of spray steelmaking includes a tundish for holding molten metal that has one or more elongate slots covered by a slidable gate to control the rate and quantity of molten metal flowing from the tundish in the form of one or more thin films of molten metal. Headers on each side of the molten film discharge oxygen and refining materials that react with the molten metal to produce steel.

BACKGROUND OF THE INVENTION

This invention relates to steelmaking and to a new and more useful method and apparatus for making steel in accordance with the spray steelmaking process.

Spray steelmaking is a relatively new process wherein a stream of molten pig iron discharging from a tundish is subjected to jets of lime and of oxygen with oxidize and refine the molten pig iron into steel. FIG. 2 illustrates one form of apparatus 11 available in the prior art for carrying into practice the spray steelmaking process. Molten pig iron 13 flows from a tundish 15 as a cylindrical stream through a chamber 17, located close to the discharge nozzle 19 of the tundish 15. Molten pig iron 13 encounters firstly particles of lime falling from a first ring encircling the molten stream of metal, and secondly the stream of metal encounters jets of oxygen 21 which emerge from a second ring surrounding the metal stream and which impinge on the stream of molten metal to oxidize the metal and refine the same to steel. The lime particles 25, which enter the chamber 17 under pressure through conduit 27, gravitate downward and mix with the turbulent mass of pig iron and oxygen in a zone below the line A—A of FIG. 1. The region below line A—A is usually enclosed in a separate spraymaking chamber capable of holding in the bottom a mass of molten steel with a slag layer on the top.

Cooling water enters the chamber 17 through conduit 29, circulating around the oxygen nozzles within the chamber to cool them, and then exist the chamber via conduit 31.

The foregoing is conventional. Those skilled in the art know that in such apparatus 11, the surface area of metal available for contact by the oxygen and the lime particles is proportional to the diameter of the orifice in the nozzle 19.

In contrast to the foregoing, the present invention discloses improved apparatus and method for making steel according to the spray steelmaking process wherein significantly greater surface area of molten metal is subjected to the lime particles and jets of oxygen.

SUMMARY OF THE INVENTION

In carrying into practice the spray steelmaking process of the invention, apparatus is used that includes a tundish having one or more elongate slots through which molten pig iron discharges as one or more thin films of metal. The slot or slots are covered and uncovered by a slidable gate and the headers are arranged on opposite sides of the metal film or films. One pair of opposite headers discharge refining materials, and another pair of similar headers discharge oxygen as jets that atomize the pig iron. The pig iron is thereby oxidized and refined as steel.

For a further understanding of the invention and for advantages and features thereof, reference may be made to the following description in conjunction with the accompanying drawing which shows, for the purpose of exemplification, a preferred and other embodiments of the invention.

DETAILED DESCRIPTION

Figure 2:
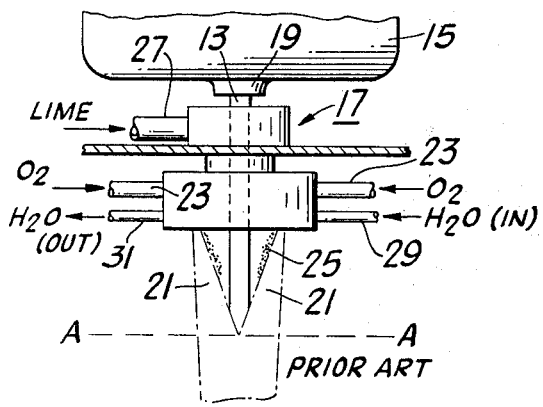
FIG. 2 is a schematic elevational view of one form of prior art spray steelmaking apparatus.

FIG. 2 illustrates an improved tundish 33 that comprises a flat-bottom vessel lined with a suitable refractory 35 into which molten metal flows, and from which molten metal, in this instance pig iron, flows through a slot or aperture 37 in the bottom of the tundish 33.

The slot or aperture 37 is a rectangular opening having a length that is several times as great as the width. By way of an example, the slot 37 may be 6 inches long and ½ inch wide, or it may be 12 inches long and ¼ inch wide. The optimum dimensions of the slot would, in any case, be established as a function of other operational parameters such as those of a continuous casting machine installation with which the apparatus of the invention may be associated or with any other apparatus that would use the molten metal produced by the apparatus 11. The dimensions of the slot would then provide a thin film of molten metal having the proper dimensions; such dimensions being related to desired quantity of metal flowing in a unit of time.

On the outside of the bottom of the tundish 33, there is installed a slidable member or gate 39, which is maintained in position by guideways 41. A conventional pneumatic or hydraulic cylinder-piston assembly 43 is connected to the gate 39 by a rod 45. Thus, by actuating the cylinder-piston assembly 43 in a known manner, the slidable gate 39 can be moved laterally to fully open and close the slot 37, or to partially open the slot 37 as much as is desired.

Figure 3:
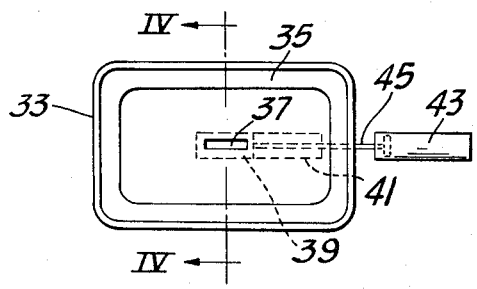
FIG. 3 is a plan view of the tundish portion of the apparatus of FIG. 1.
Figure 6:
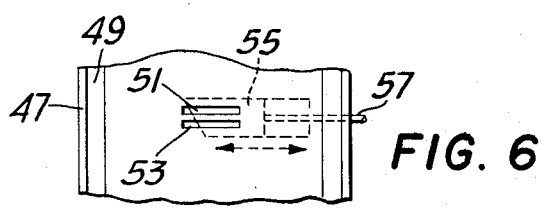
FIG. 6 is a schematic plan view of a modification of a portion of the apparatus of FIG. 3.

FIG. 6 illustrates a modification of the slot and gate arrangement shown in FIG. 3. In FIG. 6, a tundish 47, lined with a conventional refractory 49, has two spaced apart elongate slots 51, 53, which may be of equal dimensions, or which may be of unequal dimensions. Each slot 51, 53 may have its own individual gate, or both slots may be fitted and closed with a slidable gate 55, which is like the gate 59, but which has a biased front edge, wherefore the gate 55 has the appearance of a guillotine blade. Like the gate 39, the gate 55 may be actuated in any suitable manner, as by conventional cylinder piston apparatus connected to a rod 57 that is attached to the gate 55.

The slots 51, 53 may be so proportioned that the quantity and rate of flow of molten metal through the slots is optimally related to the whole spray steelmaking process.

Figure 1:
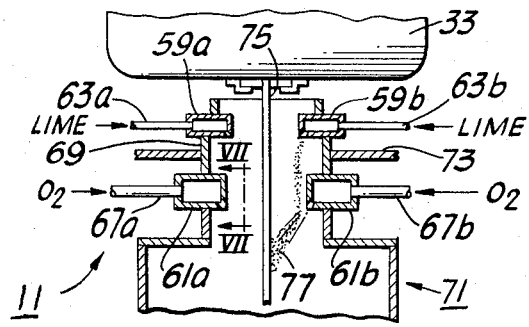
FIG. 1 is a schematic elevational view of improved spray steelmaking apparatus in accordance with the invention.

The apparatus of FIG. 1 includes also a pair of spaced apart lime headers 59a, 59b, and a pair of spaced apart oxygen headers 61a, 61b. The lime headers 59a, 59b are generally rectangular and are provided with inlet conduits 63a, 63b. Each lime header has a plurality of spaced orifices located near the lower, inner corner of the header. It will be understood, that the lime headers 59a, 59b need not be rectangular; they may be cylindrical or oval in cross sectional shape, or have any other preferred cross sectional shape if such is desired.

Each oxygen headers 61a, 61b also is rectangular and is provided with a plurality of spaced apart orifices 65 located near the lower inner corner of the header. The rectangular oxygen headers 61a, 61b too, may also have any other cross sectional form desired. The oxygen headers 61a, 61b also are provide with inlet conduits 67a, 67b.

The lime headers 59a, 59b and the oxygen headers 61a, 61b, form a part of the upper structure 69 of a spray steelmaking chamber 71. The chamber 71 may be supported on structure 73, or in any other suitable manner known to those skilled in the art so that its upper portion is adjacent the bottom of the tundish 33.

If desirable, or if necessary, both the lime headers 59a, 59b, and the oxygen headers 61a, 61b, and the upper portion 69 of the chamber 71, may be cooled by water sprays or by a surrounding water jacket in conventional manner.

Figure 5:
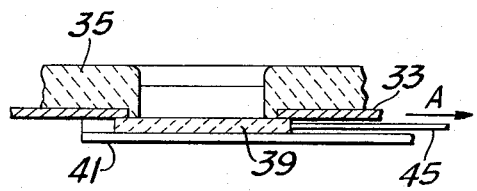
FIG. 5 is a sectional view taken along line V—V of FIG. 4.
Figure 4:
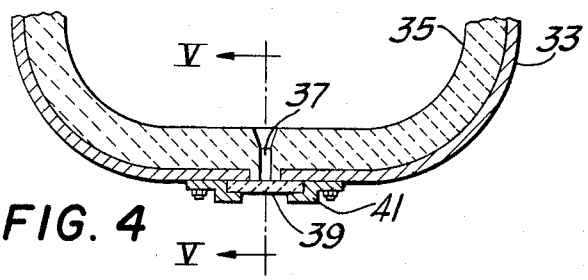
FIG. 4 is a sectional view, at an enlarged scale, taken along line IV—IV of FIG. 3.
Figure 7:
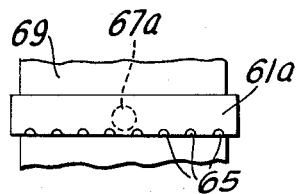
FIG. 7 is a view along line VII—VII of FIG. 1 showing one of the oxygen headers.

In operation, molten pig iron in the tundish 33 flows through the open portion of the rectangular slot 37, or the rectangular open portion of the slots 51, 53, as the gate 39 or gate 55 is withdrawn in the direction of the arrow A (FIG. 5). The molten pig iron discharges from the slot 37 as a thin film of molten metal 75 (FIG. 1), or from the pair of slots 51, 53, as two separate and spaced apart thin films of molten metal (not shown). The thin film or films of molten metal gravitate into the upper part 69 of the spray steelmaking chamber 71, and, at the same time, lime particles 77 discharging from each lime header 59a, 59b gravitate toward the chamber 71. Likewise, at the same time, oxygen flowing in conduits 67a, 67b emerge from each of the orifices or nozzles 65 as high velocity jets that impinge on the film or films of molten metal. Whereupon, the molten metal is atomized, oxidized, and refined by the lime and the oxygen in chamber 71. The refined steel collects in the bottom of the chamber 71 with a slag layer on the top, and the refined steel may be withdrawn from the chamber 71 in the usual manner.

While the gates 39, 55 may be operated to vary only the longitudinal dimension of the rectangular slot or slots, those skilled in the art will recognize that other types of gates may be used, wherefore both the width and the length of the slot or slots may be varied at the same time, or in sequence, as preferred.

Those skilled in the art will recognize the novel features and advantages of the persent invention; among which are:

That the thin film of molten pig iron emerging from the rectangular slot in the tundish of the invention presents considerably more surface area to the jets of oxygen and to the lime particles, than in devices available in the prior art. Whereby, oxidation and refining of the molten pig iron is accomplished much faster and is much improved by use of the apparatus of the invention;

That the slidable gate permits a variation, during a casting operation, in the rate of flow of molten pig iron; and consequently a change in the rate of steel production is available with the present apparatus. This feature is not found in any prior art devices known;

That the two slot type of tundish shown in FIG. 6, affords more accurate control over the rate of flow of molten metal; the guillotine-blade gate of FIG. 6 being adapted to open only one slot initially, and to terminate the flow through the same slot;

That the spaced apart individual oxygen headers afford better control over, and equalization of the pressure of, the oxygen in the headers, whereby the velocity of the oxygen jets from each headers is substantially equal. This results in more efficient use of oxygen and better oxidation of the molten metal; and that the spaced apart lime headers make it possible to distribute the lime more uniformly over the surface of the film or films of molten metal. Such a feature is not obtainable by known prior art devices.

Although the invention has been described herein with a certain degree of particularity, it is understood that the present disclosure has been made only as an example and that the scope of the invention is defined by what is hereinafter claimed.

What is claimed is:

1. In the process for spray steelmaking wherein a stream molten metal discharges from a vessel and additives and oxygen are brought into mixing relation with said molten metal, the improvement comprising the steps:
    (a) discharging molten metal through a long, narrow opening in said vessel having one dimension greater than another dimension, thereby
    (b) forming a first thin film of molten metal with which said additives and oxygen mix; and
    (c) varying at least one dimension of said opening whereby both the quantity, and the rate of flow, of said molten metal through said opening is controlled.

2. The method of claim 1 including the steps:
    (a) discharging molten metal through a second long, narrow opening in said vessel; and
    (b) forming a second thin film of metal disposed adjacent said first thin film of metal with which said additives and oxygen mix.

3. In the process for spray steelmaking, the improvement comprising the steps:
    (a) discharging molten pig iron from a long, narrow opening in a vessel holding molten pig iron so as to form a thin film of molten metal;
    (b) flowing refining additives in a first conduit disposed along one side of said film;
    (c) discharging said additives from said conduit so that said additives mix with said molten metal;
    (d) flowing oxidizing fluid in a second conduit disposed along one side of said film;
    (e) discharging said fluid from said second conduit whereby said oxidizing fluid mixes with said additives and the molten metal to refine the same; and
    (f) varying at least one dimension of said opening so that the quantity and the rate of discharge of said molten pig iron is controlled.

4. The method of claim 3 including the steps:
    (a) discharging molten pig iron from a second long, narrow aperture in said vessel so as to form a second thin film of metal spaced apart from said first film of molten metal;
    (b) flowing refining additives in a second conduit disposed alongside said films of metal and opposite to said first conduit, and
    (c) discharging said additives from said second conduit so that said additives mix with said molten metal; and
    (d) flowing oxidizing fluid in a third conduit disposed alongside said films of molten metal and opposite said second conduit; and
    (e) discharging said oxidizing fluid from said third conduit so that said oxidizing fluid mixes with said additives and the molten metal to refine the same.

5. The method of claim 4 including the step:
    (a) varying at least one dimension of each of said apertures so that the quantity, and rate of discharge, of said molten pig iron from said holding vessel is controlled.

(References on following page)

References Cited

UNITED STATES PATENTS

| | | | |
|---|---|---|---|
| 2,943,370 | 7/1960 | Murarsheed | 266—42X |
| 2,969,282 | 1/1961 | Churcher | 75—52X |
| 3,080,627 | 3/1963 | Hoteko | 164—155 |
| 3,271,128 | 9/1966 | Tartaron | 75—60 |
| 3,436,023 | 4/1969 | Thalmann | 266—42X |
| 158,903 | 7/1962 | U.S.S.R. | 266—34 |

FOREIGN PATENTS

| | | | |
|---|---|---|---|
| 158,903 | 7/1962 | U.S.S.R. | 266—34 |
| 159,552 | 4/1962 | U.S.S.R. | 75—45 |
| 949,610 | 2/1964 | Great Britain | 75—60 |

L. DEWAYNE RUTLEDGE, Primary Examiner

G. K. WHITE, Assistant Examiner

U.S. Cl. X.R.

75—60; 266—34